United States Patent [19]

Waldon

[11] 4,219,218
[45] Aug. 26, 1980

[54] HALTER TYPE COVER FOR CAR FRONT PROTECTION

[76] Inventor: Chester L. Waldon, 2019 High St., Apt. 4, Oakland, Calif. 94601

[21] Appl. No.: 840,666

[22] Filed: Oct. 11, 1977

[51] Int. Cl.² ............................................. B62D 25/00
[52] U.S. Cl. ..................................... 280/770; 296/136
[58] Field of Search ......................... 280/770; 296/136

[56] References Cited

U.S. PATENT DOCUMENTS

| | | | |
|---|---|---|---|
| 1,584,518 | 5/1926 | Drake | 296/37.1 |
| 2,880,015 | 3/1959 | Harben | 280/770 |
| 3,763,908 | 10/1973 | Norman | 150/52 K |
| 4,041,999 | 8/1977 | Miller et al. | 296/136 X |

FOREIGN PATENT DOCUMENTS

| | | | |
|---|---|---|---|
| 2053396 | 5/1972 | Fed. Rep. of Germany | 296/136 |
| 398421 | 11/1974 | U.S.S.R. | 296/136 |

*Primary Examiner*—John J. Love
*Assistant Examiner*—Norman L. Stack
*Attorney, Agent, or Firm*—Alfons Puishes

[57] ABSTRACT

A halter type protective cover is constructed to fit snugly over the front part of the hood and front fenders of a car to protect the finish from dirt, bug stains, road grime, tar, flying particles, stones and similar damaging materials. It is constructed to fasten to the vents in the top of the hood and by means of novel spring clamps to the edges of the front fenders and bumper and is especially adapted for sports and imported cars.

1 Claim, 4 Drawing Figures

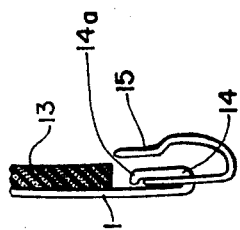
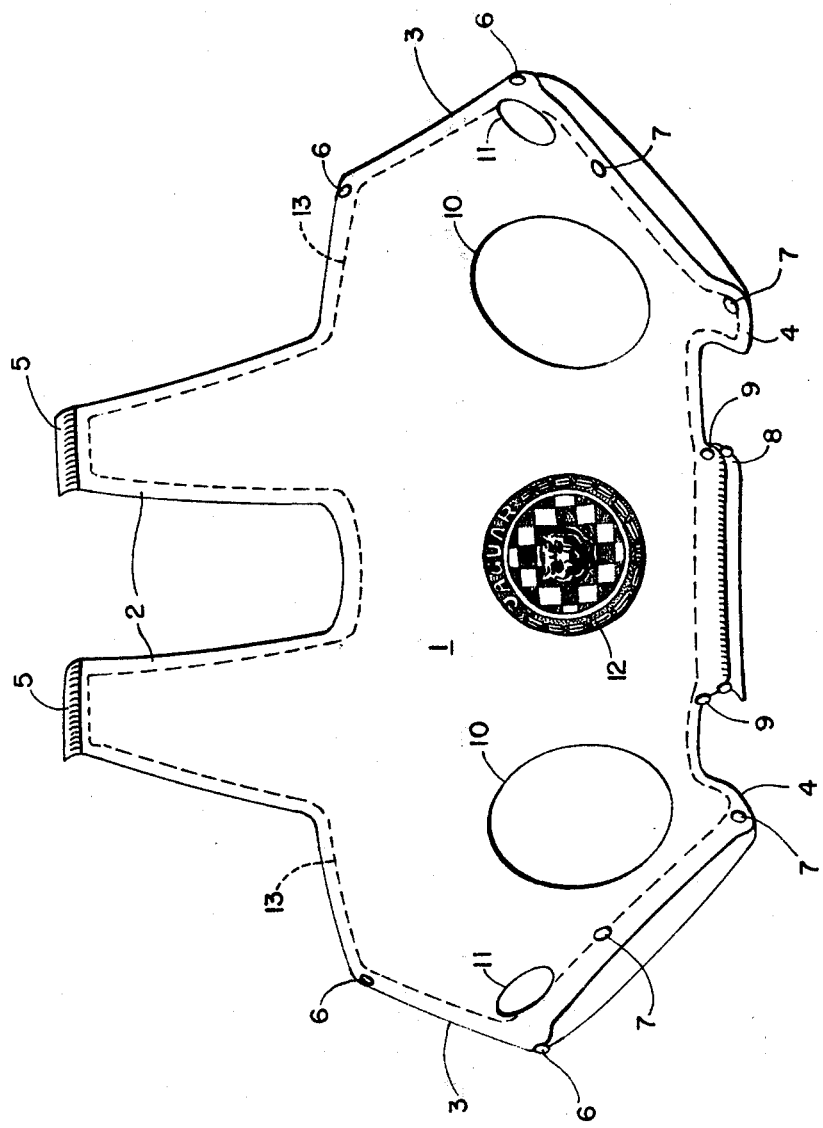
FIG. 2
FIG. 1

HALTER TYPE COVER FOR CAR FRONT PROTECTION

BACKGROUND OF THE INVENTION

The expensive finish on sports cars, particularly those of foreign make such as the Jaguar, is very vulnerable to damage by the elements and foreign objects when driving, particularly at higher speeds. Th need for a protective cover is greatly felt, particularly one which would not detract from the appearance of the car, would be stable at high speeds and afford adequate protection.

Protective covers for automobile and other vehicles have been known for some time and are generally designed and constructed for certain specific protective features.

The prior patent art as known to the applicant at this time, none of which is particularly close, is set forth briefly below.

U.S. Pat. No. 1,584,518 to Drake teaches a complete car cover which is constructed to protect not only the hood but also the top and sides as well as the rear and rear fenders of the complete body. An elaborate series of buckles, straps and snap fasteners are utilized to hold the cover in place. This patent issued in 1926 and the device does not appear to be suited for use with modern automobiles, besides being entirely too cumbersome. It does not suggest applicant's simple and compact construction for modern cars.

U.S. Pat. No. 1,704,346 to Schneider teaches a cover constructed to fasten to the body of a cariage or walker used for wheeling a small baby and is constructed to protect the baby as well as the walker or carriage. The method of fastening is novel but not suited for use for and in no way suitable to automobile covers.

U.S. Pat. No. 2,034,493 to Sonnenberg teaches a cover or guard for the front part of an automobile including the front bumper, lights, and radiator, while the automobile is being towed by another vehicle. It is constructed with a solid frame and brackets as well as a flexible material cover and in effect is a buffer only for the purposes stated above.

U.S. Pat. No. 2,119,072 to Cohen teaches a fender cover constructed to protect the fender from grease and dirt while a mechanic is leaning over it to work on the engine. It utilizes special hooks and vacuum cups to hold it in position while in use, but, of course, cannot be used for protection to the car while the latter is in motion.

U.S. Pat. No. 2,461,974 to Flora teaches an enclosure for the front of a tractor which serves the double purpose of protecting the body of the tractor and also protecting the operator as well as conveying heat from the engine to the operator for cold weather operation, the tractor operator being, of course, exposed to the elements. It comprises a solid or rigid frame structure attached to the chassis and body of the tractor and a hood of flexible material attached to the frame and forming an enclosure for part of the tractor body and the driver's seat. Applicant, of course, uses no rigid frame.

U.S. Pat. No. 3,298,712 to Greenstadt, like the Cohen patent described above, teaches a fender cover or pad for protecting the cover from grease and dirt while a mechanic is leaning over it working on the engine and includes in combination a zipper pocket provided with a lock in which the mechanic may store his tools.

U.S. Pat. No. 3,763,908 to Norman teaches a cover for the front and top of an automobile starting from the top of the head-lights and continuing up and over the windshield and back down over the rear window. It is obviously suited only for covering an automobile while it is parked and includes novel arrangement for permitting air space between the cover and the body as well as magnetic fasteners for attaching to the body. It does not suggest protection for a car while in motion.

None of this art teaches nor is it able to accomplish anything similar to that which the applicant herein does as will be evident from the following description.

SUMMARY OF THE INVENTION

Applicant has invented a car front protection cover which may be easily yet firmly attached and secured to the automobile to protect the finish from damage and still not blow away when the car is operating at high speeds. The shape resembles that of a halter used for other purposes and may be made from vinyl or heat resisting plastic or similar material with a foam rubber or felt liner. The upper, or trailing edge of the cover, has two protecting members which are adapted to slide into and be held in position by the air vents located latterly across the top of the hood in such cars as the Jaguar. The side, lower and leading edges are clamped under the bottom edge of the fenders, bumper and forward end of the hood respectively by means of a series of novel clamps attached to the peripheral edge or seam of the cover. Suitable holes or apertures are provided for headlights and sidelights and when in position the cover does not detract, in fact it enhances the appearance of the car. As thus installed on the car, it is quite stable when the car is moving at high speeds and is readily removable when desired.

DESCRIPTION OF THE DRAWINGS

FIG. 1 is a plan view of the halter type cover of the invention in flattened out position before fastening to the car front.

FIG. 2 is a partial sectional or partial schematic view through an outer peripheral edge of the cover just prior to fastening to the car front showing the clamp used for fastening.

DESCRIPTION OF A PREFERRED EMBODIMENT

Figure 3:
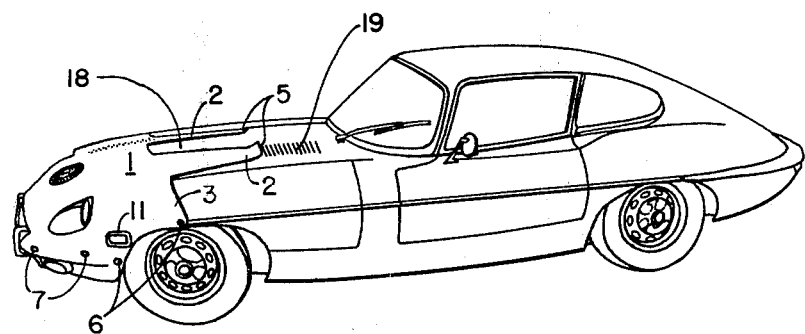
FIG. 3 is a side perspective of a car showing the halter type cover in position.

Referring now to the figures and particularly first to FIG. 1 there is seen the cover body 1 which may be made of vinyl, heat resisting plastic or similar relatively elastic material. Comprising the 3 parts of the body cover 1 are the top flaps 2, the side flaps 3 and the front flaps 4. At the upper edge of top flaps 2 are positioned slide hooked tips 5 which form a part of the top flaps 2. These may be made of any heat resistant material and are joined securely to and form a part of the top flaps. They are in turn constructed to be inserted in between and held in position by the air vents 19, forming a part of the car hood as best seen on FIG. 3.

Located on the side flaps 3 are a series of clamps 6 and 7 for fastening these flaps under the edges of the front fenders and bumper respectively. Two of the clamps 7 are positioned to fasten front flaps 4 to the front bumper.

A short center flap 8 positioned on the forward or leading edge of the center portion of the cover is equipped with clamps 9 which serve to fasten this flap under the hood at each end opposite to the front flaps.

Openings 10 are provided for the headlights and openings 11 for the side lights. A copy of the car emblem in the form of a suitable patch may be placed in the proper position as shown at 12.

The foam or felt lining over the entire underside of body 1 has its outer or peripheral edge as shown at 13 which may be seen also in partial section on FIG. 2. The outer or peripheral edge of the cover body 1 is folded over as shown at 14 and has embedded in it a U-shaped spring clamp 15 prior to forming of the seam which may be seen at 14A. The latter may be formed by vulcanizing, stitching, or any other suitable means depending on the material used for the cover body itself. This construction is used in connection with clamps 6, 7 and 9 described above.

Figure 4:
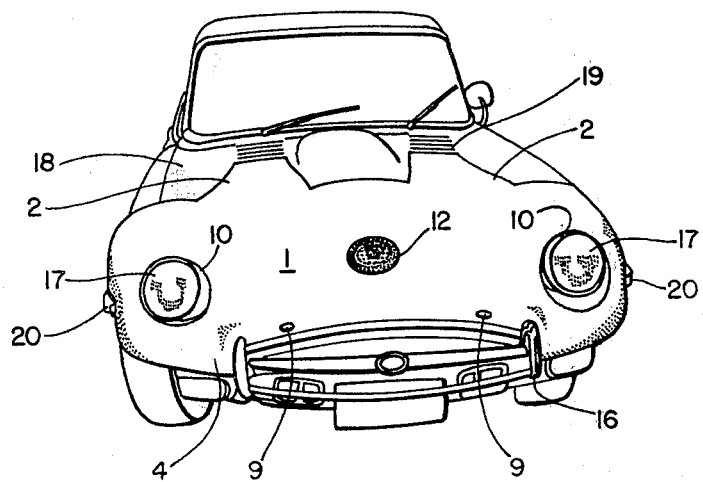
FIG. 4 is a front elevation of a car showing the halter type cover in position.

Referring now more particularly to FIGS. 3 and 4, showing the cover in position, there are seen the corresponding parts of the cover insofar as they are visible as they appear on the car when the cover is in position. Noted more specifically are the cover body 1, the top flaps 2, side flaps 3 and front flaps 4. The slide tips 5 are shown in position engaging air vents 19 as described previously. The location of the clamps 6 under the fender edge and the clamps 7 under the side bumper edge are seen particularly in FIG. 3. The position of the clamps 9 seen on FIG. 4 hold the center flap in position under the hood 18. The headlight lenses are seen at 17 and the side lights at 20.

When installing, the cover is first draped over the front end of the car. Clamps 6, 7 and 9 may then be placed in position at the edges of the fenders, bumper and hood respectively as described above. The cover may then be stretched backwards, applying a uniform tension throughout the entire surface of the body 1. For this reason a material having some elasticity as described above is preferred. The slide tips 5 are then inserted in the appropriate air vents 19 while maintaining the tension in the cover body. In this manner a snug fit is provided at all points of contact.

It should now be evident that as thus installed, the cover possesses all the properties previously enumerated and performs its extremely useful function in an efficient, as well as novel manner.

It has been found that this cover offers complete protection to the car finish. It is stable at high speeds and yet can be readily removed when desired for cleaning or other purposes.

The description above shows the invention adapted to a Jaguar XKE but it is evident that slight modifications will make it suitable for use with other models as well as different makes of cars such as the Datsun, Porsche and others having similar body construction, the same principal of construction and installation of the cover prevailing as in the illustration described.

I claim:

1. An easily removable halter type cover of flexible material disposed to cover the front end only of an automobile exclusive of the windshield adapatable for use while the car is in forward motion at high speeds comprising a body member and a plurality of peripheral members protruding from the center portion of said body member said peripheral members comprising:

a pair of parallel top flaps disposed for engagement with air vents positioned on the top of the hood of said automobile;

a pair of side flaps on opposite sides of said center portion disposed for engagement with the lower edges of the front fenders of said automobile;

a pair of front flaps on opposite sides of said center portion adjacent to said side flaps disposed for engagement with the lower edge of the front bumper of said automobile;

a front center flap on the mid-section of said center portion opposite to said top flaps disposed for engagement with the lower front edge of the hood of said automobile;

a liner of resilient material positioned on the under surface of said cover disposed for engagement with the surface of said automobile front;

a plurality of spring clamps fixedly positioned on the outer edges of said peripheral members disposed to effect the said engagement with said edges of said fenders, said bumper and said hood, said spring clamps having generally V-shaped configuration disposed for clamping over the under edges of and at predetermined points on said fenders, said bumper and said hood;

said engagements of all of said flaps and said body member being disposed for holding said cover tightly against the surface of said hood and said front end of said car thereby securing said cover in position while said car is moving forward at high speeds.

* * * * *